April 22, 1941. A. M. BANK Re. 21,773
UPHOLSTERY CONSTRUCTION
Original Filed May 5, 1938
Fig. 1.
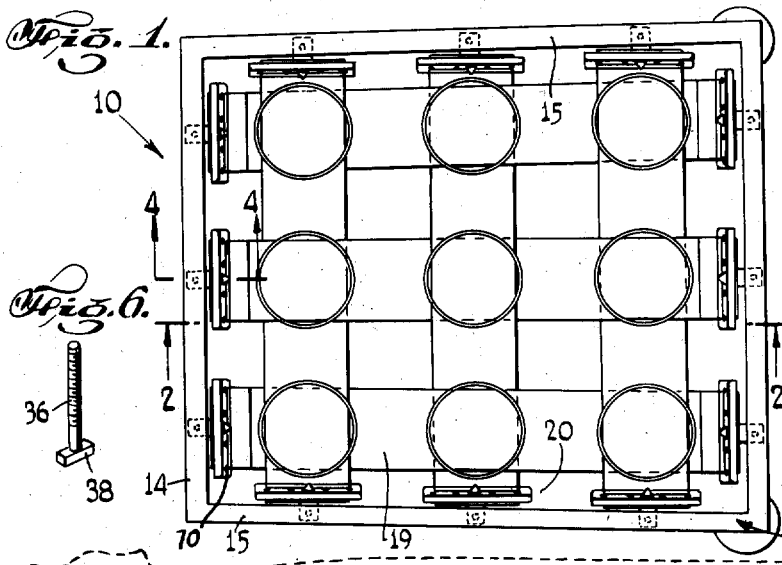
Fig. 6.
Fig. 4.
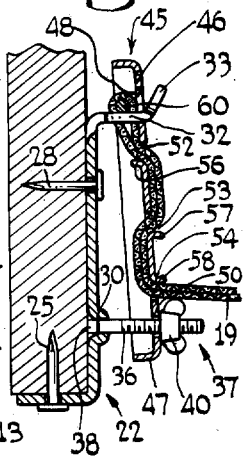
Fig. 2.
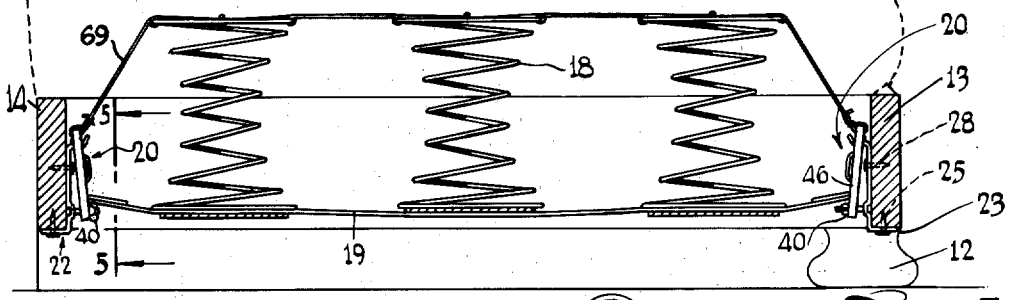
Fig. 3.
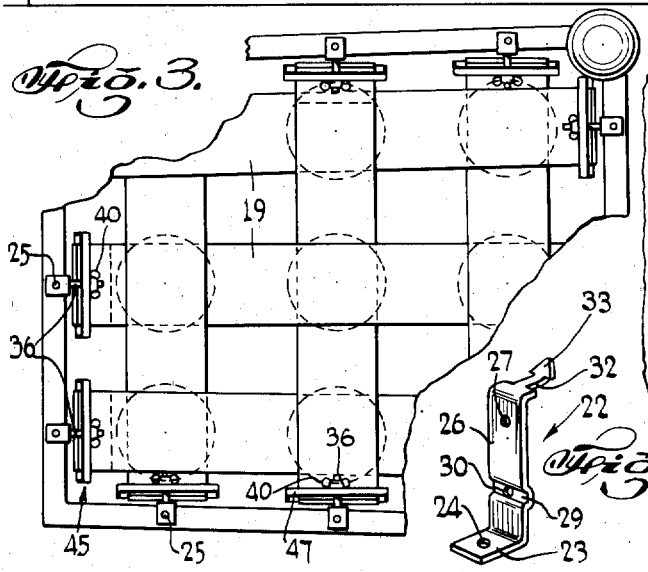
Fig. 5.
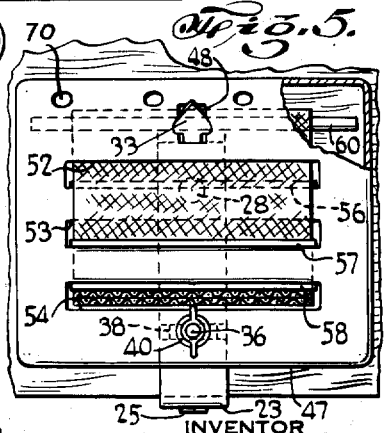
Fig. 7.
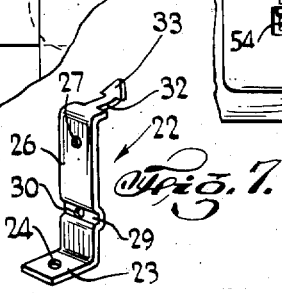
INVENTOR
Albert M. Bank
BY
J. B. Felshin
ATTORNEY Reissued Apr. 22, 1941

Re. 21,773

UNITED STATES PATENT OFFICE 21,773

UPHOLSTERY CONSTRUCTION

Albert M. Bank, Jersey City, N. J., assignor to Sylvia Bank, Jersey City, N. J.

Original No. 2,192,294, dated March 5, 1940, Serial No. 206,198, May 5, 1938. Application for reissue May 18, 1940, Serial No. 336,037

4 Claims. (Cl. 155—179)

This invention relates to upholstery construction provided with a spring seat.

An object of this invention is to provide upholstery construction of the character described, comprising strip webbing supporting the foundation springs attached to the seat frame by means for adjusting the tension on the strips, such means being so arranged as to lie parallel and adjacent to the inner surfaces of the base frame walls, whereby the foundation springs may be placed on said strips close to the frame walls.

Another object of this invention is to provide upholstery construction of the character described, comprising strip webbing, and highly improved means for attaching the ends of the webbing strips to the frame walls of the seat base, and for adjusting the tension of said strips.

Still another object of this invention is to provide strong, rugged and durable upholstery construction of the character described, which shall be inexpensive to manufacture, easy to assemble and adjust, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of an upholstery frame provided with spring supporting webbing, embodying the invention;

Fig. 2 is a cross-sectional view taken on line 2—2 of Fig. 1;

Fig. 3 is a partial, bottom plan view of the structure shown in Fig. 1;

Fig. 4 is a cross-sectional view taken on line 4—4 of Fig. 1;

Fig. 5 is a cross-sectional view taken on line 5—5 of Fig. 2;

Fig. 6 is a perspective view of the adjusting screw; and

Fig. 7 is a perspective view of one of the brackets.

Referring now in detail to the drawing, 10 designates upholstery construction embodying the invention, comprising a seat frame 11 supported on legs 12. The frame 11 has a front wall 13, a rear wall 14, and side walls 15.

The frame 11 is provided with strip webbing to support the foundation springs 18. The webbing comprises a plurality of strips 19, extending from front to rear, and connected to the front and rear walls 13 and 14 of the base by similar strip connecting and adjusting means 20; and a plurality of webbing strips extending from side to side and connected to the side walls 15 by similar connecting and adjusting means 20.

Said connecting means 20 at the end of each strip 19 comprises a bracket 22, preferably made from a flat, elongated strip of metal, and having a horizontal portion 23 contacting the underedge of one of said frame walls, and formed with an opening 24 to receive a nail 25 driven upwardly into the frame wall.

Extending upwardly from said portion 23 is a vertical portion 26 contacting the inner surface of the frame wall, and formed with an opening 27 to receive a nail 28 driven into the frame. Said portion 26 is formed with a horizontal groove 29 on the inner surface thereof, said grooved portion being formed with an opening 30 for the purpose hereinafter appearing.

Extending from the upper end of said portion 26, inwardly of the frame wall, is a horizontal neck portion 32 of reduced width and formed with an upwardly inclined head portion 33.

Extending through the opening 30 is the shank 36 of a bolt or screw 37 having a head 38 disposed within the groove 29 and between the bracket 22 and the inner surface of the frame wall. The head 38 has parallel edges, as shown in Fig. 6, so that the bolt 37 will not rotate about its axis. On the end of the bolt 37 is a wing nut 40.

Pivotally mounted on the portion 32 of each bracket 22, in the manner hereinafter described in detail, is a member 45, receiving one end of a strip 19. Said member 45 may be made as a stamping from a piece of sheet metal, or in any other suitable manner. The same comprises a flat plate 46 provided with marginal top, bottom and side flanges 47. Said wall 46 is formed with a central opening 48, adjacent the top end thereof of greater width than the neck portion 32 of the bracket, but of less width than the head 33. Said opening 48 however is of greater length than the width of the head 33. Said head may be inserted through the opening 48 by holding member 45 in such position that the head may be passed through the opening 48, and the member 46 may then be turned downwardly to the position shown in Fig. 4.

Said wall 46 is also formed with a central opening 50, adjacent the bottom thereof, to receive the shank 36 of the bolt 37. It will now be understood that the member 45 may be pivotally rotated about the upper end thereof, by rotating the wing nut 40, as illustrated in Fig. 4 of the drawing. Said wall 46 is furthermore formed with a plurality of horizontal parallel slots 52, 53 and 54, disposed between the openings 48 and 50. The metal from the opening 52 may be bent inwardly, as at 56, whereas the metal from the openings 53 and 54 may be turned outwardly, as at 57 and 58, for the purpose hereinafter appearing.

One end of the strip 19 is doubled or folded over and passed back and forth through the openings 54, 53 and 52, as shown in Fig. 4 of the drawing. The lips 56, 57 and 58 prevent cutting of the strip 19 when tension is exerted on the strip. A pin 60 is inserted within the fold of the strip 19, and the neck and head portions 32 and 33 of the bracket are pierced through the strip 19, below the pin 60. The pin 60 is thus located between the neck portion 32 of the bracket and the upper edge of the member 45, and between the side flanges 47 of said member. The side flanges of said member prevent the pin from accidentally falling out. The strip 19 is firmly attached to the member 45 by reason of being woven or passed through the slots 52, 53 and 54, and also because of the engagement of the pin with the bracket, and the passage of the head of said bracket through the strip.

It will now be understood that the member 45 is located substantially parallel to the frame wall. Each strip 19 may be tensioned at opposite ends by rotating the wing nuts 40. With this construction, substantially the entire length of the strip 19 between the opposite frame walls is available to support the foundation springs 18, and said springs may be placed on substantially the entire length of the strips, even relatively close to the frame walls so that there is no loss of available supporting area for the foundation springs.

Means is provided for attachment of the tie cords 69 for the foundation springs 18 with the members 45. To this end, each member 45 is formed with a plurality of openings 70, adjacent the top flange 47 thereof. The tie cord 69 for the foundation springs 18 may be looped through the openings 70 and thus fastened to the members 45, thus eliminating the necessity for the usual brackets or other fastening means fixed to the frame walls for connection to the tie cords.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the acompanying drawing is to be interpreted as illustrative and not in a limiting sense.

Having thus described my invention, I claim as new and desire to secure by Letters Patent:

1. In upholstery construction, a frame having upstanding walls, a bracket having a portion contacting the inner surface of one of said walls, means for attaching said bracket to said wall, a member pivotally connected to said bracket, said bracket having an opening below the point of pivotal connection of said member to said bracket, a screw passing through said opening and having a head non-rotatably engaging said bracket, said screw extending at right angles to said wall, said member being formed with an opening receiving said screw, a nut on said screw adapted to be turned on said screw for swinging said member on its pivot toward said wall, said member being formed with a plurality of parallel slots, a piece of strip webbing, one end of said strip being folded back, said folded portion passing through said slots, and a pin in the fold of said strip.

2. In upholstery construction, a frame having an upstanding wall, a bracket having a portion contacting the underedge of said wall, and formed with an opening to receive a nail driven upwardly into said wall, said bracket having a portion extending upwardly from the first portion thereof and engaging the inner surface of said wall, and formed with an opening to receive a nail driven into said wall, said bracket being formed with an opening disposed adjacent the lower edge of said wall, a screw passing through said opening and having a head non-rotatably engaging said bracket, said bracket being formed with a neck portion extending from the portion which contacts the inner surface of said wall, at right angles to said portion, a head on said neck portion, a plate having an opening adapted to receive said head, said plate being formed with a second opening receiving said screw, a nut on said screw adapted to be turned for swinging said plate about said head, said plate being formed with a plurality of parallel, horizontal slots between said openings thereof, a strip of webbing doubled over at one end, the doubled over portion of said strip passing back and forth through said slots, a pin in the fold of said doubled over portion disposed above and engaging the neck portion of said bracket, said head and neck portion of said bracket piercing through the doubled over portion of said strip.

3. In upholstery construction, a frame, a bracket fixed to a wall of said frame, a member disposed substantially parallel to and adjacent the inner surface of said wall, and being pivoted at its upper end to said bracket at a point above the lower edge of said wall, means disposed adjacent said edge and engaging said member below the pivotal point of said member, for rotating said member about its pivotal point to bring the lower end of said member closer to said wall, and bottom spring supporting means attached to the lower end of said pivoted member and to an opposite wall of said frame, said spring supporting means being attached to said member at a point above the point of engagement of said rotating means with said member.

4. In upholstery construction, a frame having upstanding walls, a bracket having a portion contacting the inner surface of one of said walls, means for attaching said bracket to said wall, a member pivotally connected to said bracket, said bracket having an opening below the point of pivotal connection of said member to said bracket, a screw passing through said opening and having a head non-rotatably engaging said bracket, said screw extending away from said wall, said member being formed with an opening receiving said screw, a nut on said screw adapted to be turned on said screw for swinging said member on its pivot toward said wall, and bottom spring supporting means engaging a portion of said member below its pivotal point, and above said opening connecting said member with an opposite wall of said frame.

ALBERT M. BANK.